United States Patent
Johri et al.

(10) Patent No.: US 9,428,178 B2
(45) Date of Patent: Aug. 30, 2016

(54) VEHICLE BATTERY POWER TRANSFER LIMIT MANAGEMENT SYSTEM AND METHOD

(71) Applicant: FORD GLOBAL TECHNOLOGIES, LLC, Dearborn, MI (US)

(72) Inventors: Rajit Johri, Ann Arbor, MI (US); Mark Steven Yamazaki, Canton, MI (US); Scott James Thompson, Waterford, MI (US); Chen Zhang, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 14/283,775

(22) Filed: May 21, 2014

(65) Prior Publication Data
US 2015/0336566 A1    Nov. 26, 2015

(51) Int. Cl.

| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2016.01) |
| F02N 11/08 | (2006.01) |
| B60W 10/08 | (2006.01) |
| B60W 10/26 | (2006.01) |
| B60W 30/19 | (2012.01) |
| B60W 30/192 | (2012.01) |

(52) U.S. Cl.
CPC .............. *B60W 20/30* (2013.01); *B60W 10/08* (2013.01); *B60W 10/26* (2013.01); *B60W 20/00* (2013.01); *B60W 30/19* (2013.01); *B60W 30/192* (2013.01); *F02N 11/0862* (2013.01); *B60W 2510/246* (2013.01); *B60W 2600/00* (2013.01); *B60W 2710/10* (2013.01); *Y10S 903/93* (2013.01)

(58) Field of Classification Search
CPC .... B60W 20/00; B60W 10/08; B60W 10/06; Y02T 10/6286; B60K 6/445
USPC ......................................................... 701/22
See application file for complete search history.

(56) References Cited

U.S. PATENT DOCUMENTS

| | | | |
|---|---|---|---|
| 6,868,318 B1 | 3/2005 | Cawthorne et al. | |
| 7,976,427 B2 | 7/2011 | Yamamoto et al. | |
| 8,400,112 B2 | 3/2013 | Anderson | |
| 2009/0149295 A1* | 6/2009 | Yamamoto | B60K 6/48 477/109 |
| 2011/0140668 A1* | 6/2011 | Anderson | H01M 10/44 320/134 |

* cited by examiner

*Primary Examiner* — Maceeh Anwari
(74) *Attorney, Agent, or Firm* — David B. Kelley; Brooks Kushman P.C.

(57) ABSTRACT

A vehicle includes a powertrain including an electric machine and a traction battery. The vehicle also includes at least one controller programmed to, during a transmission shift event, cause the electric machine to absorb torque. The torque absorption causes current generated by the electric machine to charge the battery according to a predetermined power transfer schedule defining a charge limit. The controller is further programmed to permit the current to exceed the charge limit for a predetermined duration of time in certain instances.

16 Claims, 2 Drawing Sheets

VEHICLE BATTERY POWER TRANSFER LIMIT MANAGEMENT SYSTEM AND METHOD

TECHNICAL FIELD

The present disclosure relates to power flow management of vehicle high voltage power sources.

BACKGROUND

A battery used in an electric vehicle or hybrid electric vehicle, like any battery, has limited power transfer capabilities. Power transfer beyond certain limits may be undesirable. Limiting charging and discharging current to less than the full battery power transfer capabilities may prolong battery service life. Appropriate limits may also be affected by vehicle operating conditions. Battery power transfer limits can also operate to constrain vehicle performance where higher levels of power transfer are demanded.

SUMMARY

In at least one embodiment, a vehicle includes a powertrain including an electric machine and a traction battery. The vehicle also includes at least one controller programmed to, during a transmission shift event, cause the electric machine to absorb torque. The torque absorption causes current generated by the electric machine to charge the battery according to a predetermined power transfer schedule defining a charge limit. The controller is further programmed to permit the current to exceed the charge limit for a predetermined duration of time in certain instances.

In at least one embodiment, a vehicle includes a powertrain including an electric machine and a traction battery. The vehicle also includes a controller programmed to limit charge and discharge currents of the battery according to predetermined charge and discharge power transfer limits. The controller is also programmed to reduce the limits in response to a change in at least one condition of the battery, and permit the currents to exceed the corresponding reduced limits during a transmission shift event or an engine start event.

In further embodiments, the change in at least one battery condition may include a change in battery temperature or a change in battery state of charge.

In at least one embodiment a method of controlling a powertrain having an electric machine includes limiting power transfer between the electric machine and a battery according to a power transfer schedule based on a temperature and state of charge of the battery. The method also includes allowing power transfer from the electric machine to the battery to exceed the power transfer schedule during a transmission gear shift. The method additionally includes allowing power transfer from the battery to the electric machine to exceed the power transfer schedule during an engine start event.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
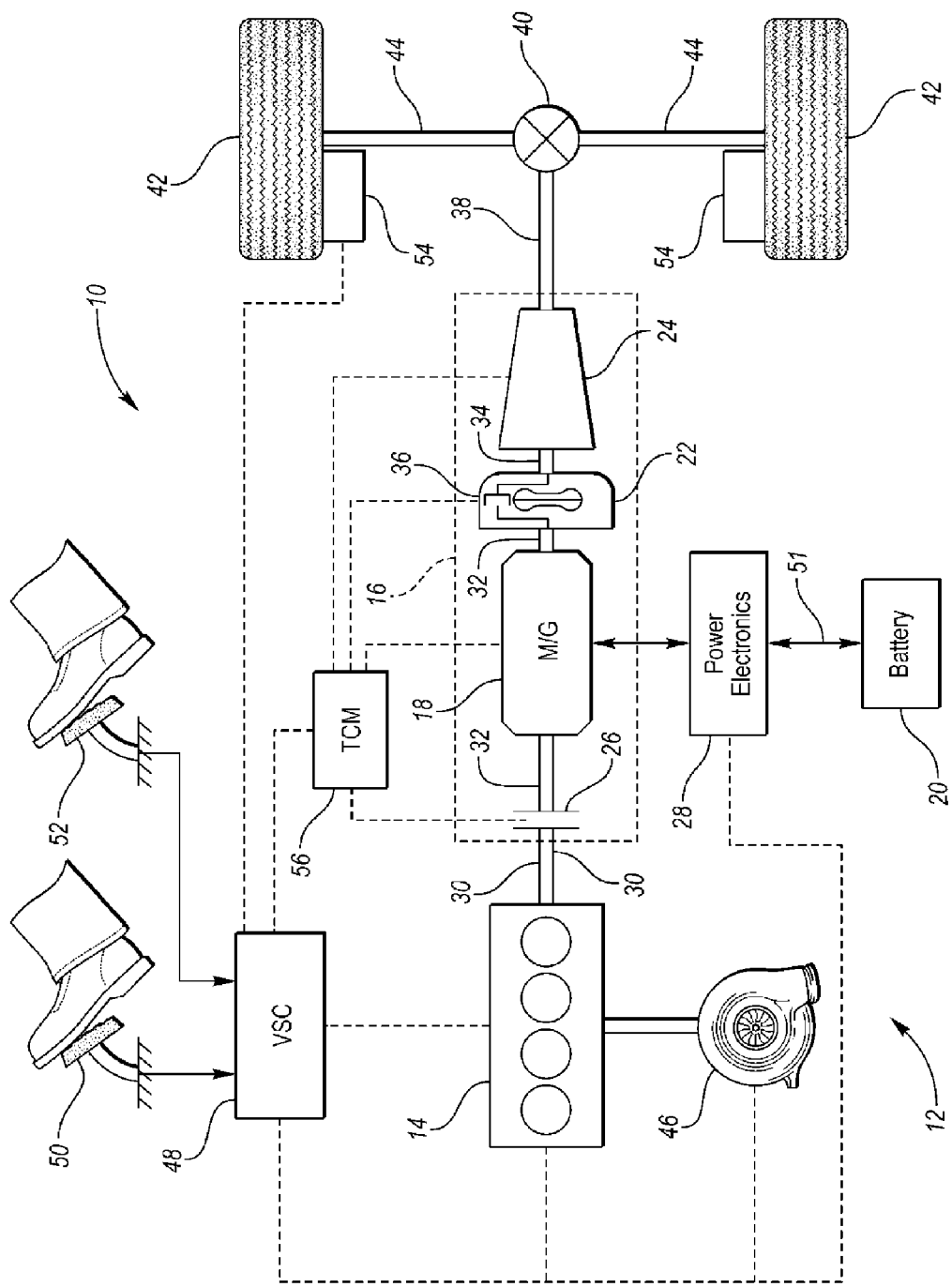
FIG. 1 is a schematic of a hybrid electric vehicle.

Referring to FIG. 1, a schematic diagram of a hybrid electric vehicle (HEV) 10 is illustrated according to an embodiment of the present disclosure. FIG. 1 illustrates representative relationships among several vehicle components. Physical placement and orientation of the components within the vehicle may vary. The vehicle 10 includes a powertrain 12. The powertrain 12 includes an engine 14 that drives a transmission 16. As will be described in further detail below, the transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18, as will be described below. For example, power electronics may provide three phase alternating current (AC) to the M/G 18.

The engine 14 may additionally be coupled to a turbocharger 46 to provide an air intake pressure increase, or "boost" to force a higher volume of air into a combustion chamber of the engine 14. Related to the increased air pressure provided to the engine 14 by the turbocharger 46, a corresponding increase in the rate of fuel combustion may be achieved. The additional air pressure boost therefore allows the engine 14 to achieve additional output power, thereby increasing engine torque.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The gearbox 24 ultimately provides a powertrain output torque to output shaft 38.

As further shown in the representative embodiment of FIG. 1, the output shaft 38 is connected to a differential 40. The differential 40 drives a pair of wheels 42 via respective axles 44 connected to the differential 40. The differential transmits torque allocated to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The vehicle 10 further includes a foundation brake system 54. The system may comprise friction brakes suitable to selectively apply pressure by way of stationary pads attached to a rotor affixed to the wheels. The applied pressure between the pads and rotors creates friction to resist rotation of the vehicle wheels 42, and is thereby capable of slowing the speed of vehicle 10.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. As discussed in more detail below, the rotational resistance imparted on the shaft through regeneration of energy may be used as a brake to decelerate the vehicle. The disconnect clutch 26 can also be disengaged to decouple the engine 14 from the remainder of the powertrain 12 such that the M/G 18 can operate as the sole drive source for the vehicle 10.

Operation states of the powertrain 12 may be dictated by at least one controller. While illustrated by way of example as a single controller, such as a vehicle system controller (VSC) 48, there may be a larger control system including several controllers. The individual controllers, or the control system, may be influenced by various other controllers throughout the vehicle 10. Example controllers that may be included within representation of the VSC 48 include a transmission control module (TCM), brake system control module (BSCM), a high voltage battery energy control module (BECM), as well as other controllers in communication which are responsible for various vehicle functions. The at least one controller can collectively be referred to as a "controller" that commands various actuators in response to signals from various sensors. The VSC 48 response may serve to dictate or influence a number of vehicle functions such as starting/stopping engine 14, operating the M/G 18 to provide wheel torque or recharge the traction battery 20, select or schedule transmission gear shifts, etc. The VSC 48 may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from the engine 14, the turbocharger 46, the disconnect clutch 26, the M/G 18, the transmission gearbox 24, torque converter 22, the torque converter bypass clutch 36, and the power electronics 28. Although not explicitly illustrated, those of ordinary skill in the art will recognize various functions or components that may be controlled by the VSC 48 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter bypass clutch 36, and transmission gearbox 24, and the like. Sensors communicating input through the I/O interface may be used to indicate turbocharger boost pressure, turbocharger rotation speed, crankshaft position, engine rotational speed (RPM), wheel speeds, vehicle speed, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The VSC 48 also includes a torque control logic feature. The VSC 48 is capable of interpreting driver requests based on several vehicle inputs. These inputs may include, for example, gear selection (PRNDL), accelerator pedal inputs, brake pedal input, battery temperature, voltage, current, and battery state of charge (SOC). The VSC 48 in turn may issue command signals to the transmission to control the operation of the M/G 18.

The M/G 18 is also in connection with the torque converter 22 via shaft 32. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter 22 provides a hydraulic coupling between shaft 32 and transmission input shaft 34. An internal bypass clutch 36 may also be provided torque converter such that, when engaged, clutch 36 frictionally or mechanically couples the impeller and the turbine of the torque converter 22, permitting more efficient power transfer. The torque converter bypass clutch 36 may be operated as a launch clutch to provide smooth vehicle launch. In contrast, when the bypass clutch 36 is disengaged, the M/G 18 may be decoupled from the differential 40 and the vehicle axles 44. For example, during deceleration the bypass clutch 36 may disengage at low vehicle speeds, providing a torque bypass, to allow the engine to idle and deliver little or no output torque to drive the wheels.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the vehicle torque output demanded by the driver. The controller 48 may also control the timing of gear shifts within the gearbox 24, as well as engagement or disengagement of the disconnect clutch 26 and the torque converter bypass clutch 36. Like the disconnect clutch 26, the torque converter bypass clutch 36 can be modulated across a range between the engaged and disengaged positions. This may produce a variable slip in the torque converter 22 in addition to the variable slip produced by the hydrodynamic coupling between the impeller and the turbine. Alternatively, the torque converter bypass clutch 36 may be operated as either locked or open without using a modulated operating mode depending on the particular application.

The driver of vehicle 10 may additionally provide input at brake pedal 52 to create a vehicle braking demand. Depressing brake pedal 52 generates a braking input signal that is interpreted by controller 48 as a command to decelerate the vehicle. The controller 48 may in turn issue commands to cause the application of negative torque to the powertrain output shaft. Additionally or in combination, the controller may issue commands to activate the brake system 54 to apply friction brake resistance to inhibit rotation of the vehicle wheels 42. The negative torque values provided by both of the powertrain and the friction brakes may be allocated to vary the amount by which each satisfies driver braking demand.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional powered torque to turn the shaft 32. This operation mode may be referred to as a "hybrid mode." As mentioned above, the VSC 48 may be further operable to issue commands to allocate a torque output of both the engine 14 and the M/G 18 such that the combination of both torque outputs satisfies an accelerator 50 input from the driver.

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time in order to conserve fuel, for example. The traction battery 20 transmits stored electrical energy through wiring 51 to power electronics 28 that may include an inverter. The power electronics 28 convert high-voltage direct current from the battery 20 into alternating current for use by the M/G 18. The VSC 48 may further issue commands to the power electronics 28 such that the M/G 18 is enabled to provide positive or negative torque to the shaft 32. This operation where the M/G 18 is the sole motive source may be referred to as an "electric only" operation mode.

Additionally, the M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may also act as a generator during times of regenerative braking in which rotational energy from spinning of the output shaft 38 is transferred back through the gearbox 24 and is converted into electrical energy for storage in the battery 20.

In the powertrain 12 as described above, the M/G 18 may also be used for torque modulation during a transmission gear shift or engine start. Torque modulation may include the M/G 18 supplying a positive or negative torque to the powertrain output shaft in order to smooth the transition of powertrain output torque during the change of gears. In the case of application of a resistive negative torque, power may be generated at the M/G 18 from the torque absorbed. However, the amount of negative torque applied, and subsequently the power generated at the M/G 18, is constrained by charging and discharging limits of the high voltage traction battery 20. Also, these charging and discharging limits are affected by vehicle operating conditions. As discussed in more detail below, the limits are generally lowered due to system considerations, such as prolonging battery service life.

The BECM or the VSC 48 monitors the battery temperature, voltage, current, SOC and determines the maximum allowable discharge power limit and maximum allowable charge power limit. The VSC 48 in turn operates the powertrain in accordance with the charging limits in place at a given point in time based on vehicle operating conditions. The torque control logic feature considers the charging and discharging limits of the battery when regulating M/G 18 output and input. Generally, the limits are based on maintaining the health of the battery 20 and maximizing battery service life. A buffer is maintained between the imposed charge or discharge limit and the capability of the battery 20 to deliver or receive power.

The VSC 48 also maintains a schedule of limits for allowable power transfer to and from the battery based on the operating conditions. A slow charging strategy is often employed where the amount of allowed charging current applied to the battery 20 is limited to an amount that can safely be applied over a long period of time without damaging battery cells. Slow charging and discharging current limits are generally designed to maximize service life of the battery 20. The slow charging current limits also are conservative in that they are less than the full power transfer capabilities of the battery 20. The slow charging current is typically associated with charging over an extended number of hours, for example overnight.

In some scenarios the VSC 48 allows for a fast charging strategy that allows application of greater power transfer to and from the battery 20. Fast charging current limits allow for quicker recharge, but they also carry a higher risk of affecting the battery cells due to increases in battery cell temperature and/or internal pressure of the cells. Therefore fast charging and discharging is applied only applied for shorter periods of time and at lower SOC values, for example during the initial portion of a longer recharge period.

Both of the fast and slow charging and discharging current limits are further affected by system considerations. Battery charging and discharging limits can be lowered in response to changes in at least one battery condition such as battery temperature or SOC for example. In at least one embodiment, when battery temperature changes to a value that is outside of a predetermined temperature range, the allowable power transfer to and from the battery is reduced to help prolong the battery service life. Similarly, a change in SOC to values outside of a predetermined SOC range may invoke a reduction in power transfer limits. More specifically, a high SOC value may case a restriction on the maximum amount of current allowed to be delivered to the battery. Conversely, a low SOC value may cause a restriction on the maximum amount of power allowed to be discharged from the battery. Also, an overall state of health of the battery may also influence when any of the fast and slow charging and discharging current limits are implemented. As the battery service life is exhausted, the current transfer limits may evolve. A predetermined power transfer schedule containing limits corresponding to various vehicle parameters may be stored in a lookup table for example.

In cases where the power transfer limits have been reduced related to vehicle conditions, the M/G 18 may be prevented from providing required torque for engine 14 starts and torque modulation during gear shifts of the transmission gear box 24. During electric drive modes, an inability to conduct torque modulation with the M/G 18 can result in poor shift smoothness and degraded drivability. In hybrid drive modes, torque modulation can be done with spark retard techniques within the combustion chamber of engine 14 but this can result in an inconsistent driver feel and reduced fuel economy. Similarly, inability to conduct engine starts using the M/G 18 can result in degraded powertrain performance or poor fuel economy.

Generally, slow charging and discharging current limits are used as a default to govern power management of the battery 20. However larger magnitude fast charging limits can be employed over short periods in spite of battery temperature and SOC status when there is a transient increase in positive or negative torque demanded from the M/G 18. Therefore a temporary increased power transfer limit may be applied during transmission shift events as well as engine 14 start events.

Torque modulation during a transmission 16 gear shift may require sudden increase in negative torque applied by the M/G 18 causing a spike in charging current provided to the battery 20. Torque modulation helps to minimize the powertrain 12 output torque variation during a transmission gear shift. Particularly where the battery 20 SOC is above a threshold, slow charging current limits may be in effect, and prevent the M/G 18 from applying required negative regenerative torque. But where a high amount of torque is required to be absorbed by the M/G 18 for torque modulation during shifting, the charging limit may be temporarily increased to allow the M/G 18 to apply a larger regenerative torque and accept an increased charge current for a short period of time. This adjustment allows the powertrain 12 to fully utilize the capability of the M/G 18 during key driving periods, yet still avoids unusual wear on the battery 20. In at least one embodiment the battery charge limit is allowed to be exceeded for a predetermined time that is less than a full duration of a shift event.

Also, it may be desirable to start or restart the engine 14 as quickly as possible in certain scenarios. Therefore it can be advantageous to devote significant M/G output torque to start the engine, demanding a spike in discharging power. As discussed above, during periods of reduced power transfer limits the power required to provide high M/G output torque may be greater than the reduced limits. In at least one embodiment, a controller is programmed to temporarily exceed the battery power transfer limits for a predetermined time during a shift event or for an engine start event. For example, either the BECM or the higher level VSC 48 may be authorized to temporarily exceed the standard scheduled power transfer limits.

Figure 2:
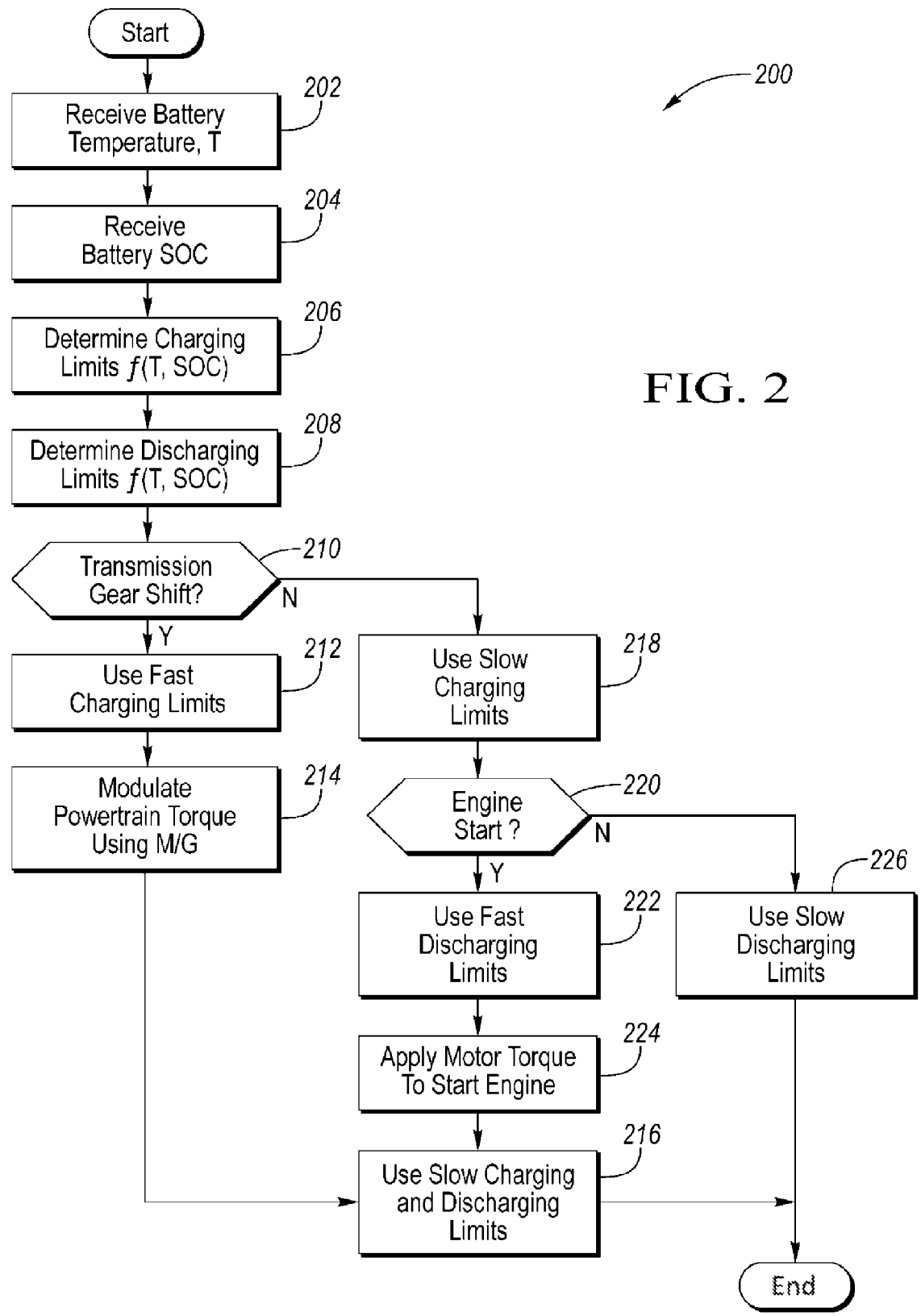
FIG. 2 is a flowchart corresponding to a method of managing battery power transfer.

Referring to FIG. 2, a method 200 of managing battery power transfer is depicted. At step 202 a signal indicative of batter temperature is received by a controller. At step 204 a signal indicative of the battery SOC is received. At step 206 the controller may determine appropriate charging limits as a function of the battery temperature and battery SOC. Similarly, at step 208 the controller may determine battery discharging limits based on the battery temperature and battery SOC. For example, the charging and/or discharging limits may be determined from a lookup table. Also, the limits can be based on a number of vehicle operating conditions in addition to battery temperature and SOC.

At step 210 the controller considers whether or not the transmission is engaged in a gear shift. If a gear shift is underway, an increased charging limit is applied at step 212. Using the increased limit, the M/G modulates powertrain torque output at step 214, and the controller routes current generated by the M/G to the battery. In this way, the transition in powertrain output torque may be smoothed during gear shifting. At step 216 slow charging limits are reinstated once the gear shift is completed. In at least one embodiment, the increased charge limits are applied for a predetermined duration of time that is less than the full duration of time for a gear shift event.

At step 210 if there is no transmission gear shift underway, default charging limits are retained at step 218. At step 220 the controller considers whether or not an engine start has been requested. If an engine start command has been issued, increased discharging limits are applied at step 222. The controller routes current from the battery to the M/G according to the increased limit, and the M/G is allowed to provide increased torque output to start the engine at step 224. Once the engine start event is completed, the default slow discharging limits are implemented at step 216. In at least one embodiment, the increased discharge limits are applied for a predetermined duration of time that is less that the duration of the engine event. At step 226 if no engine start has been requested, the default slow discharging limits are applied to battery power discharge.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a powertrain including an electric machine;
   a traction battery; and
   at least one controller configured to, during a transmission shift event, cause the electric machine to absorb torque, cause current generated by the electric machine to charge the battery according to a predetermined power transfer schedule defining a charge limit, and permit the current to exceed the charge limit for a predetermined duration of time.

2. The vehicle of claim 1 wherein the predetermined duration of time is less than a duration of the shift event.

3. The vehicle of claim 1 wherein the controller is further configured to, in response to an engine start command, permit current from the battery to the electric machine to exceed a discharge limit during a corresponding engine start event.

4. The vehicle of claim 1 wherein the predetermined power transfer schedule is based on a temperature of the battery.

5. The vehicle of claim 1 wherein the predetermined power transfer schedule is based on a state of charge of the battery.

6. A vehicle comprising:
   an electric machine;
   a traction battery; and
   a controller configured to limit charge and discharge currents of the battery according to predetermined charge and discharge power transfer limits, reduce the limits in response to a change in at least one condition of the battery, and permit the currents to exceed the corresponding reduced limits for a predetermined duration of time during a transmission shift event or an engine start event.

7. The vehicle of claim 6 wherein the predetermined power transfer limits comprise a slow charging limit and a slow discharging limit based on power transfer thresholds associated with a state of health of the battery.

8. The vehicle of claim 6 wherein the change in at least one condition comprises a temperature of the battery falling outside a predetermined temperature range.

9. The vehicle of claim 6 wherein the change in at least one condition comprises a state of charge of the battery falling outside a predetermined state of charge range.

10. The vehicle of claim 6 wherein a magnitude of the discharge current during the engine start event is sufficient to power the electric machine to start an engine.

11. A method comprising:
    by a processor,
       limiting power transfer between an electric machine and battery according to a power transfer schedule based on a temperature and state of charge of the battery;
       during a transmission gear shift, allowing power transfer from the electric machine to the battery to exceed the power transfer schedule; and
       during an engine start event, allowing power transfer from the battery to the electric machine to exceed the power transfer schedule.

12. The method of claim 11 further comprising modulating a torque output by the powertrain using the electric machine to apply a resistive torque to generate power at the electric machine.

13. The method of claim 11 further comprising starting an engine using an output torque of the electric machine enabled by power supplied by the battery.

14. The method of claim 11 where the allowing power transfer to and from the battery that is greater than the power transfer schedule is restricted to a predetermined duration of time.

15. The method of claim 11 further comprising reducing an allowable power transfer in response to a battery temperature changing to a value outside of a predetermined temperature range.

16. The method of claim 11 further comprising reducing an allowable power transfer in response to a battery state of charge changing to a value outside of a predetermined state of charge range.

* * * * *